United States Patent
Leonov et al.

(10) Patent No.: US 8,032,900 B2
(45) Date of Patent: Oct. 4, 2011

(54) CONDUCTING CLIENT-SERVER INTER-PROCESS COMMUNICATION

(75) Inventors: Mikhail V. Leonov, Seattle, WA (US); Eric H. Feiveson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 11/497,830

(22) Filed: Aug. 2, 2006

(65) Prior Publication Data

US 2008/0127206 A1    May 29, 2008

(51) Int. Cl.
G06F 3/00    (2006.01)
(52) U.S. Cl. ....................................... 719/328; 719/330
(58) Field of Classification Search .................. 719/313, 719/310, 328, 330; 709/219
See application file for complete search history.

(56) References Cited

U.S. PATENT DOCUMENTS

| | | | |
|---|---|---|---|
| 5,682,534 A | 10/1997 | Kapoor et al. | |
| 6,131,126 A | 10/2000 | Kougiouris et al. | |
| 6,157,959 A * | 12/2000 | Bonham et al. | 719/313 |
| 6,226,689 B1 * | 5/2001 | Shah et al. | 719/314 |
| 6,263,456 B1 * | 7/2001 | Boxall et al. | 714/31 |
| 6,324,492 B1 * | 11/2001 | Rowe | 703/13 |
| 6,704,768 B1 * | 3/2004 | Zombek et al. | 709/201 |
| 6,748,452 B1 | 6/2004 | Elphinstone et al. | |
| 7,114,106 B2 * | 9/2006 | Klotz et al. | 714/712 |
| 2001/0003193 A1 | 6/2001 | Woodring et al. | |
| 2002/0038340 A1 * | 3/2002 | Whipple et al. | 709/203 |
| 2003/0120782 A1 | 6/2003 | Bortoloso et al. | |
| 2003/0202522 A1 * | 10/2003 | Jiang | 370/401 |
| 2005/0010925 A1 | 1/2005 | Khawand et al. | |
| 2005/0108251 A1 | 5/2005 | Hunt | |
| 2006/0167982 A1 * | 7/2006 | Jawa et al. | 709/203 |
| 2006/0168136 A1 * | 7/2006 | Bethlehem et al. | 709/219 |

FOREIGN PATENT DOCUMENTS

| | | |
|---|---|---|
| EP | 0689139 A2 | 12/1995 |
| WO | WO2005062787 A2 | 7/2005 |

OTHER PUBLICATIONS

Simon Gay, Types and Subtypes for Client-Server Interactions, 1999.*
Barham et al, "Learning Communication Patterns in Singularity", research.microsoft.com/~tharris/papers/2006-sysml.pdf.
Russel, Stephen, "Single-User Capabilities in Interprocess Communication", 1988, pp. 45-52, vol. 22, Issue 2, ACM Press, New York, USA, //delivery.acm.org/10.1145/50000/43918/p45-russell.pdf?key1=43918&key2=6047237411&coll=ACM&dl=ACM&CFID=71140410&CFTOKEN=82064992.
Steinberg et al, "Fast Component Interaction for Real-Time Systems", os.inf.tu-dresden.de/papers_ps/steinberg_ecrts2005.pdf.

* cited by examiner

Primary Examiner — Lechi Truong

(57) ABSTRACT

A computer system that is configured to conduct communications between a client process and a server process is disclosed. To conduct such communications, an inter-process communication thread is initiated that is separate from a main client inter-process communication thread and operates to establish a connection with a server. A client communication port is created during the establishment of the connection with the server. One or more non-blocking asynchronous communications are transmitted to a server communication port. Responses to the one or more non-blocking asynchronous communications are awaited for receipt by the client communication port.

12 Claims, 5 Drawing Sheets

CONDUCTING CLIENT-SERVER INTER-PROCESS COMMUNICATION

BACKGROUND

Computer systems are systems that manipulate data according to a list of instructions called a program. A program contains instructions that are understandable and executable by a computer's main processor. An operating system is a type of computer program that controls applications that can be run on the computer. Computer programs can include sub-system components that drive various processes when they are executed. The various processes that can be associated with one or more computer program sub-systems can communicate through a protocol called inter-process communication (IPC).

IPC can be used to facilitate the coordination of activities among different program processes that run concurrently in an operating system. An advantage of coordinating the activities of different program processes is that it enables a program to handle many user requests at the same time. Since even a single user request can result in multiple processes running in the operating system on the user's behalf, each of the processes should be provided with the capacity to communicate with the others. IPC interfaces make this possible. A type of IPC is called local procedure call (LPC).

LPC is a protocol that one computer program can use to request a service from a computer program located in the same computer. LPC uses the client/server model. The service requesting program is called the client and the service-providing program is called the server. LPC is a synchronous operation that requires that operations of the requesting program to be suspended until the results of the local procedure are returned. However, the use of lightweight processes or threads that share the same address space allows multiple LPCs to be performed concurrently.

LPC can be implemented using kernel "port" objects. As a part of the process, a server process first creates a port object with a well known name and then waits for client processes to connect. A client process can connect by "opening" the port object and sending a connect message. If the server accepts the connection a new unnamed port object is created for the connection. Port objects are securable kernel objects that allow a process to identify a process on the other side of the connection.

LPC is the fastest IPC that is used on the WINDOWS™ platform. Unfortunately, LPC does not possess request or connection timeout support, which can cause client processes to "hang" (be suspended) while waiting for server replies (there currently is not a mechanism for aborting a client call to the server). To overcome this limitation, conventional products perform client side LPC communication from a separate thread.

FIG. 1 illustrates the operation of LPC. It should be appreciated that client subsystem 101 and server subsystem 105 that are shown in FIG. 1 represent respective processes that execute on a computer. As shown in FIG. 1, initially, a client subsystem 101 spawns a separate thread 103a as shown at 103, for the purpose of communicating with server subsystem 105 via server side port object 109a that has been previously created (e.g., 109). The separate thread 103a is maintained during client-server communications. After a connection between the client subsystem and the server subsystem has been established in a manner such as is discussed above, at 115-117, the separate thread 103a can perform synchronous calls (see 119-125) to server subsystem 105 via server side port object 109a. LPC seeks to isolate possible delays from the main client process through the use of separate thread 103a.

It should be appreciated that although this approach achieves better stability than regular LPC, it introduces extra memory and speed costs that are associated with maintaining the additional thread on the client side. Another approach is to tolerate the lack of client side LPC timeout support and address resultant crashing or hanging as it occurs. This approach is dependent on an unsatisfactory manual response to the problem. Still other approaches to addressing the lack of client timeout support require undesirable infrastructural changes at the operating system level and consequential core changes on both client subsystem and server subsystem sides at the application level.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conducting client-server inter-process communications is disclosed. Such communications include initiating an inter-process communication thread that is separate from a main client inter-process communication thread, where the inter-process communication thread that is separate from the main client inter-process communication thread establishes a connection with a server. A client communication port is created during the establishment of the connection with the server. One or more non-blocking asynchronous communications are transmitted to a server communication port. Responses to the one or more non-blocking asynchronous communications are awaited for receipt by the client communication port. Inter-process communications are conducted in a manner that avoids a blocking of the execution of main client processes and in a manner that avoids the memory and speed resource expenditures that are associated with maintaining a separate thread for the purpose of executing such communications.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While embodiments will be described herein, it will be understood that these descriptions are not intended to limit the disclosed subject matter to specific embodiments. On the contrary, the embodiments are intended to cover alternatives, modifications and equivalents, which may be included within the spirit and scope of the subject matter disclosed herein as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 2A:
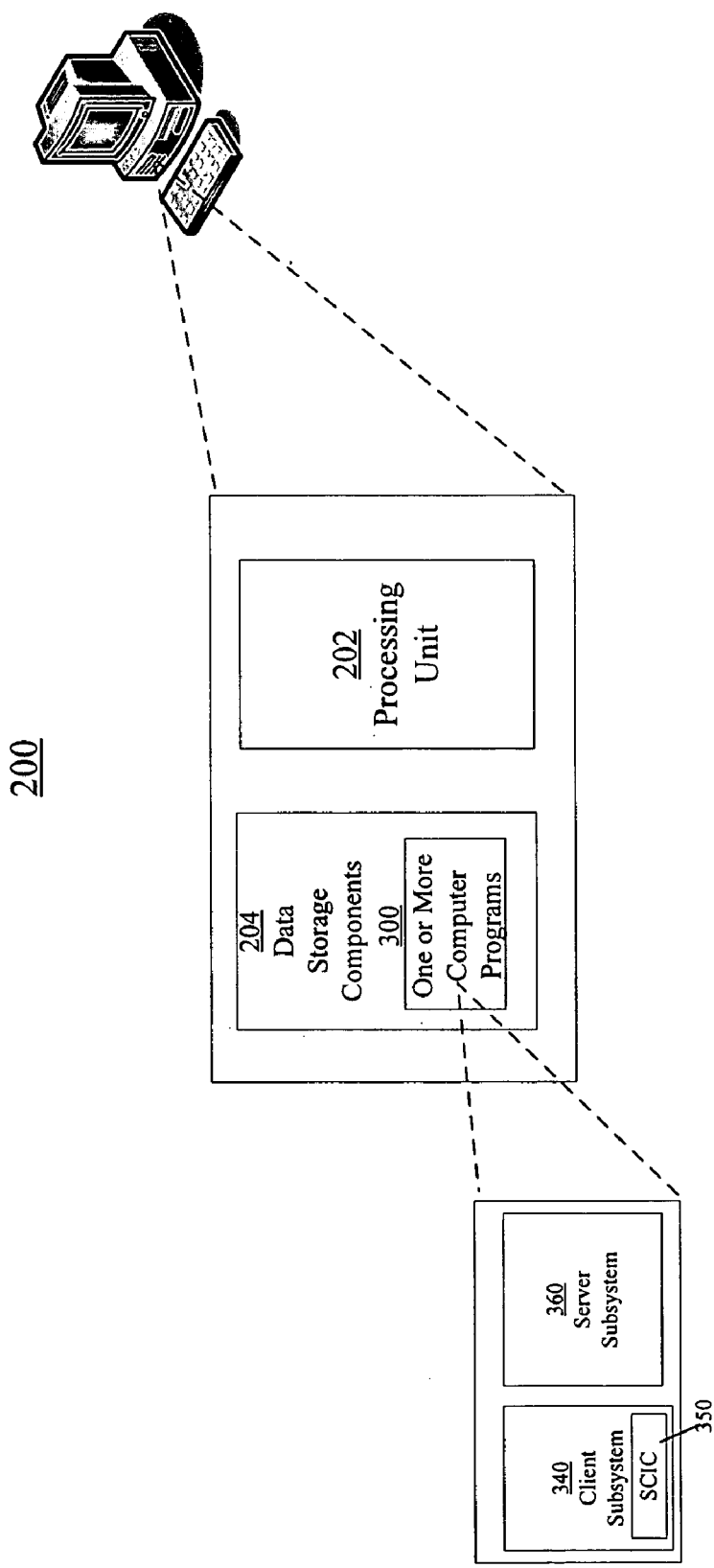
FIG. 2A is a block diagram of a computer system upon which a system (SCIC) for conducting client-server inter-process communications can be implemented according to one embodiment.

Exemplary Operating Environment of System for Conducting Client-Server Inter-Process Communications According to Embodiments FIG. 2A is a block diagram of a computer system 200 upon which a system (SCIC) 350 for conducting client-server inter-process communications can execute according to one embodiment. In one embodiment, SCIC 350 directs the conduction of inter-process communications between internal sub-systems (client and server) of one or more computer programs 300 that are resident on computer system 200. In one embodiment, the conduction of these inter-process communications is performed in a manner that avoids a blocking of the execution of main client processes and in a manner that avoids the memory and speed resource expenditures that are associated with maintaining a separate thread for the purpose of executing such communications.

In one embodiment, SCIC 350 accomplishes this by directing the creation of a client side port that has functionality similar to that of server side local procedure call (LPC) ports (e.g., it possesses a time out function) during the establishment of a client process connection with a server side port. The creation of a client side port is discussed herein in detail with reference to FIG. 2B. This port can be used (in combination with the server side port) in the execution communications between server and client processes and to support a dual port approach to inter-process communications. It should be appreciated that the aforementioned client side port can be used instead of a separate memory and speed burdening separate client side thread to receive communications from a server process.

In one embodiment, unlike communications between a separate client thread and a server side port associated with a server process, communications (e.g., calls) between a client side port and the server side port associated with a server process can include timeout support. Consequently, these communications may not block other client processes.

In the FIG. 2A embodiment, computer system 200 includes at least one processing unit 202 and data storage components 204 wherein one or more computer programs 300 reside. In one embodiment, one or more computer programs 300 can include client subsystem 340 and server subsystem 360 as is shown in FIG. 2A. It should be appreciated that although only two subsystems are shown in FIG. 2A for clarity and brevity, one or more computer programs 300 can include numerous internal client and server subsystems and processes. For purposes of the discussion that follows, client subsystem 340 and server subsystem 360 represent client and server processes operating on computer system 200 and that engage in inter-process communications.

In one embodiment, SCIC 350 can be encompassed by components and operations of client subsystem 340 (see FIG. 2A). In an alternate embodiment, SCIC 350 can be separate from client subsystem 340 but can operate in cooperation with components and operations thereof.

It should be appreciated that depending on the computer system (e.g., 200) configuration and type, data storage components 204 (computer readable media) can include volatile (such as RAM) and/or non-volatile (such as ROM, flash memory, etc.) components. Other data storage components that can be a part of computer system 200 include but are not limited to CD-ROM, DVD or other optical storage, magnetic cassettes, magnetic tape, magnetic disk storage or other magnetic storage devices, or any other medium which can be used to store the desired information and which can be accessed.

Similarly, computer system 200 can also include input devices and output devices (not shown). Moreover, computer system 200 can include network connections to other devices, computers, networks servers, etc. using either wired or wireless media. All these devices are well known in the art and need not be discussed here at length.

Although computer system 200 is shown and described in FIG. 2A as having certain numbers and types of elements, embodiments are not limited to the implementation shown in FIG. 2A. That is, computer system 200 can include elements other than those shown in FIG. 2A. Moreover, computer system 200 can include more than one of each of the elements that are shown in FIG. 2A.

It should also be noted that the computer system (e.g., 200) upon which one or more computer programs (e.g., 300) reside and upon which SCIC 350 executes can possess a variety of forms. For example, computer system 200 can be but is not limited to being a personal desktop computer (as is shown in FIG. 2A), a portable notebook computer, a personal digital assistant (PDA), and a gaming system.

Figure 2B:
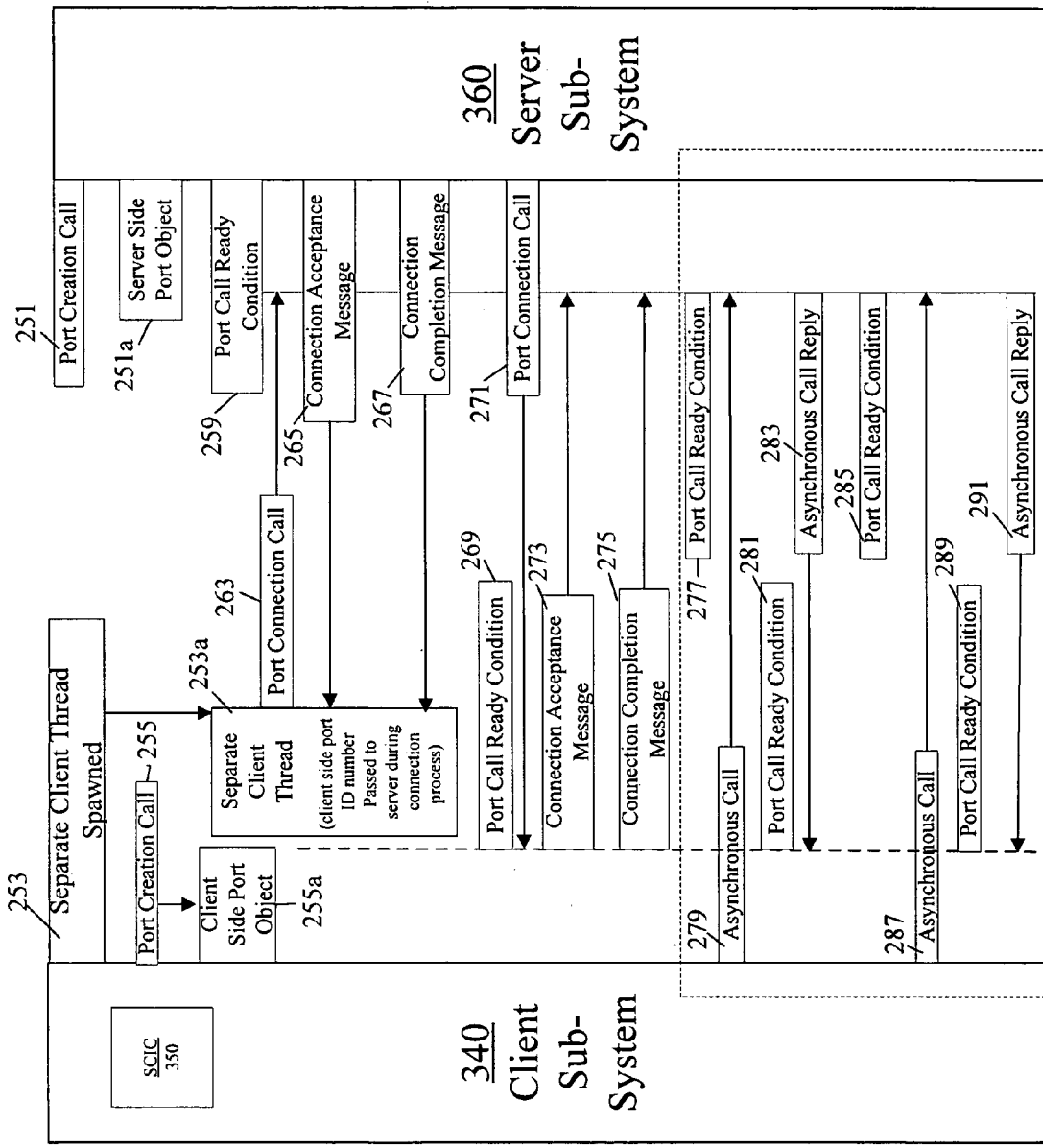
FIG. 2B illustrates the operation of SCIC as a part of client server inter-process communications according to one embodiment.

Operation of System for Conducting Client-Server Inter-Process Communications FIG. 2B illustrates the operation of SCIC 350 in the context of client-server inter-process communications. SCIC 350 is shown in FIG. 2B as being encompassed by client subsystem 340. In the FIG. 2B embodiment, SCIC 350 directs the creation of a server side communications port and inter-process communications between client subsystem 340 and server subsystem 360.

In operation, in a first phase, a server side port object 251a is created and thereafter handshake messages between client subsystem 340 and server subsystem 360 are exchanged that establish a connection via the server side port object 251a for supporting communications between client subsystem 340 and server subsystem 360. Moreover, an identification number of a client side port 255a is passed to the server subsystem during the establishment of the connection. These operations are illustrated at 251-267 shown in FIG. 2B and are described in detail below.

Referring to FIG. 2B, the aforementioned server side port object 251a is created at 251. In the FIG. 2B embodiment, server side port object 251a is created through the use of a server subsystem port creation call (e.g., NtCreateWaitablePort in WINDOWS™). Subsequently, at 253 a separate client subsystem inter-process communication thread (separate from a main client subsystem thread) 253a is spawned by client subsystem 340. Thereafter, the client side port object 255a is created. In the FIG. 2B embodiment, client side port object 255a is created through the use of a client subsystem port creation call 255 (e.g., NtCreateWaitablePort in WINDOWS™).

In the FIG. 2B embodiment, the readiness of the server side port object 251a to receive messages is indicated by port object call readiness condition 259 (e.g., NtReplyWaitReceivePortEx in WINDOWS™). Subsequently, at 261 (as a part of the aforementioned communication thread that is separate from the main client communication thread) a port connection call 263 (e.g., a request for port access) is transmitted to server side port object 251a. In response, messages can be transmitted to client subsystem 340 via the separate thread that indicate that the port connect request has been accepted 265 and completed 267. It should be appreciated that the series of message exchanges 263-267 is termed a "handshake." In the FIG. 2B embodiment, a port identification number of client side port object 255a can be transmitted to server subsystem 360 during the handshake (during the establishment of the connection as indicated in the drawings).

After the initial connection has been established and the identification number of client side port object 255a has been transmitted to the server subsystem 360, a second handshake can be performed, this time establishing a connection between the client side port object 255a and the server subsystem 360. Upon the completion of the second handshake, a series of non-blocking asynchronous client side calls (e.g., messages that can terminate after a period or after being responded to) that initiate and drive exchanges between client subsystem and server system processes can be commenced as is described below.

Referring again to FIG. 2B, the readiness of the client side port object 255a to receive messages in order that the aforementioned second handshake can be commenced is indicated by a port object call readiness condition shown in FIG. 2B at 269 (e.g., NtReplyWaitReceivePortEx in WINDOWS™). Subsequently, at 271 a port connection call from server subsystem 360 can be transmitted to client side port object 255a. In response, messages can be transmitted to server subsystem 360 that indicate that the port connection call 271 has been accepted as shown at 273 and completed as shown at 275.

In one embodiment, measures that can be employed to avoid server subsystem side hang that may be caused by the potentially blocking port connection call 271 (port connection call 271 can block other server subsystem processes if in response to port connection call 271 port connection acceptance message 273 and port connection completion message 275 are not forthcoming) that is a part of the second handshake can include but are not limited to: (1) creating a separate short lived server subsystem inter-process communication thread for the second handshake, (2) using a pre-created server subsystem inter-process communication thread for the second handshake, and (3) using an available inter-process communication thread from a thread pool for the second handshake.

As discussed above, upon the completion of the second handshake that establishes a connection between client subsystem 340 and server subsystem 360 processes via client side port object 255a and server side port object 351a, non-blocking asynchronous client side calls (e.g., 279 and 287) that initiate and drive exchanges between client subsystem 340 and server subsystem 360 can be commenced (client subsystem 340 invokes a server subsystem 360 procedure or process through calls 279 and 287, whose results, asynchronous call replies 283 and 291, are delivered back to the client side port object 255a point of call). It should be appreciated that port call ready condition, e.g., 277, 281, 285, and 289, indicates the readiness of the respective port objects to receive calls.

Figure 1:
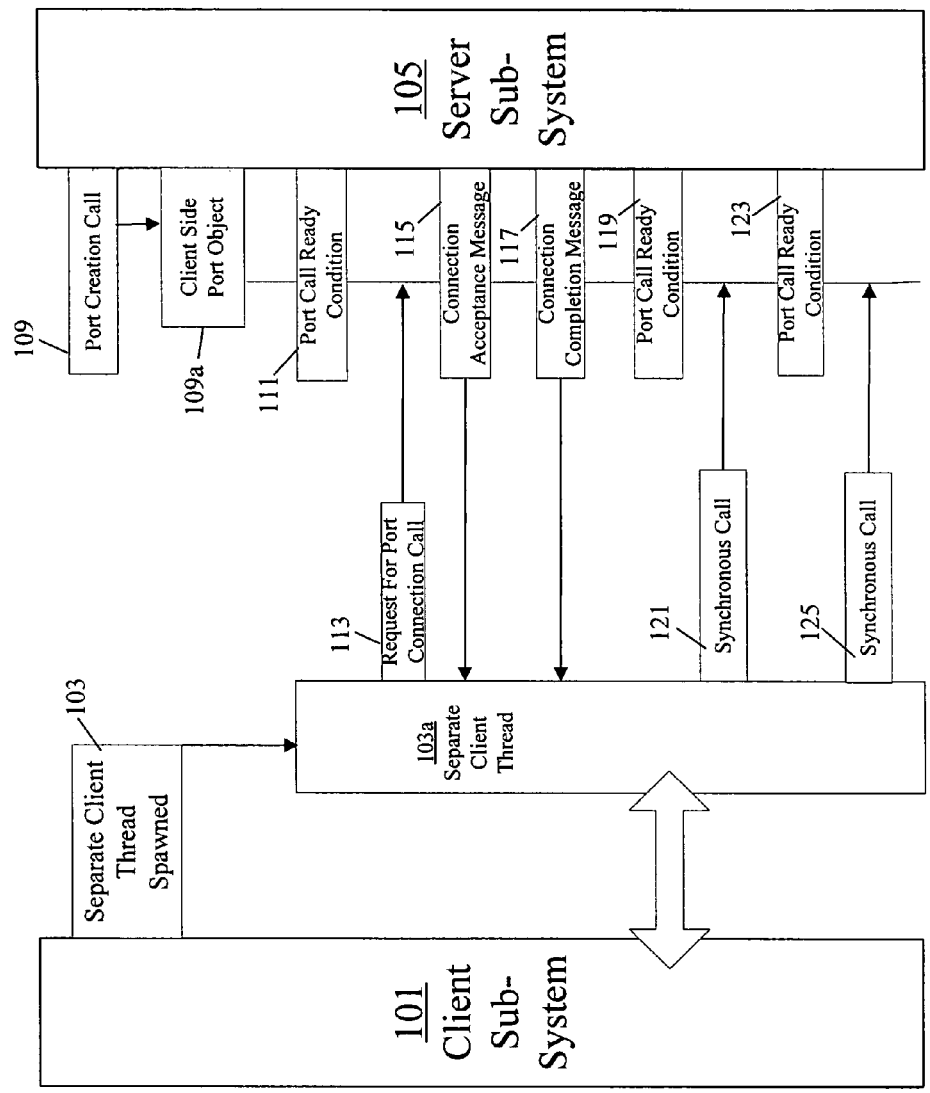
FIG. 1 illustrates the operation of (LPC) local procedure call.

It should be appreciated that asynchronous calls such as 279 and 287 can operate independently of other processes whereas synchronous calls (such as those discussed with reference to FIG. 1) are executed as a result of other processes being completed. Exemplary components of SCIC 350 that can support the aforementioned operations of SCIC 350 described above are described below with reference to FIG. 3.

It should be appreciated that embodiments take advantage of server subsystem side functions that support a timeout feature and reverses client subsystem 340 and server subsystem roles 360 by identifying a client side port to server subsystem 360 during the initial handshake. Because the port created on the client side can possess timeout support (unlike a separate client side thread) subsequent inter-process communications between client subsystem 340 and server subsystem 360 can use LPC with timeout support. Moreover, this can be done without the need to maintain a separate client subsystem 340 thread throughout an LPC session.

Figure 3:
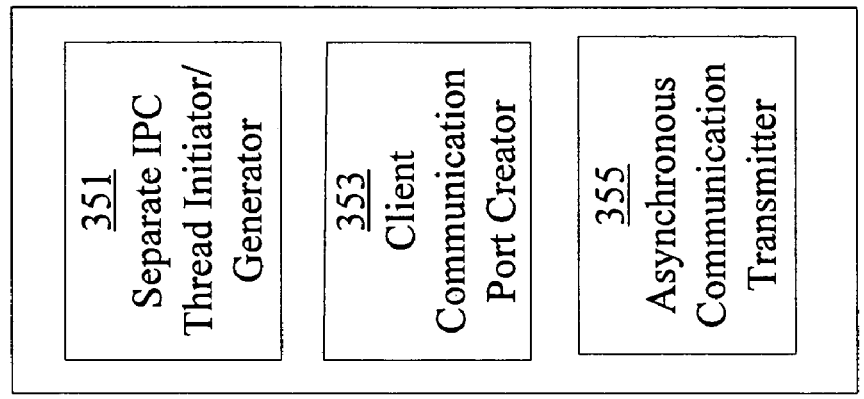
FIG. 3 shows components of a system for conducting client-server inter-process communications (SCIC) according to one embodiment.

Components of System for Conducting Client-Server Inter-Process Communications According to Embodiments FIG. 3 shows components of a system 350 for conducting client-server inter-process communications (SCIC) according to one embodiment. In one embodiment, SCIC 350 directs the conduct of inter-process communications between internal sub-systems (client and server) of one or more computer programs (e.g., 300 in FIG. 2A) that execute on a computer system (e.g., 200 in FIG. 2A). In one embodiment, inter-process communications are conducted in a manner that avoids a blocking of the execution of main client processes and in a manner that avoids the memory and speed resource expenditures that are associated with maintaining a separate thread for the purpose of executing such communications.

It should be appreciated that components of SCIC 350 can be implemented in hardware or software or in a combination of both. In one embodiment, SCIC 350 can be encompassed by components and operations of a client subsystem (e.g., 340 in FIG. 2) of a computer program (e.g., 300 in FIG. 2) that executes on a computer system (e.g., 200 in FIG. 2). In another embodiment, components and operations of SCIC 350 can be separate from the aforementioned client subsystem but can operate cooperatively with components and operations thereof. In the FIG. 3 embodiment, components of SCIC 350 include inter-process communication thread initiator/generator 351, client subsystem inter-process communication port generator 353 and asynchronous inter-process communication transmitter 355.

Referring to FIG. 3, inter-process communication thread initiator/generator 351 initiates the generation of a client subsystem (e.g., 340 in FIG. 2) inter-process communication thread that is separate from a main client subsystem inter-process communication thread. In one embodiment, the separate client subsystem inter-process communication thread facilitates client subsystem calls that serve to establish a connection with a server subsystem so as to allow information related to the identification of a client subsystem side inter-process communications port (e.g., client side port object 255a of FIG. 2B) to be passed to the server subsystem.

In one embodiment, during the establishment of a connection with the server subsystem an identification number of a client subsystem side inter-process communication port (e.g., client side port object 255a of FIG. 2B) is transmitted to the server subsystem so that the server subsystem can identify the client subsystem side inter-process communication port (e.g., client side port object 255a of FIG. 2B). In one embodiment, once the connection has been established the separate client subsystem inter-process communication thread can be terminated (see FIG. 2B).

Client subsystem inter-process communication port creator 353 creates a client side inter-process communication port (e.g., client side port object 255a of FIG. 2B) during the establishment of the connection between the client subsystem and the server subsystem. In one embodiment, the client inter-process communication port (e.g., client side port object 255a of FIG. 2B) can be created in order to facilitate the conduction of client-server inter-process communications that may not rely upon the maintenance of a client subsystem thread that is separate from a main client subsystem thread.

In this manner memory and speed resource expenditures associated with the maintenance of a separate client thread are avoided. As is discussed herein, the client side inter-process communication port (e.g., client side port object 255a of FIG. 2B) is created during the establishment of the connection between the client and the server via the separate thread.

Asynchronous communications transmitter 355 transmits non-blocking asynchronous inter-process communications (non-blocking calls, messages, requests etc.) to a server side inter-process communication port. In one embodiment, the client side inter-process communication port (e.g., client side port object 255a of FIG. 2B) is readied to receive responses to the aforementioned one or more non-blocking asynchronous communications before the transmission of the non-blocking asynchronous inter-process communications (through the aforementioned connection process).

In one embodiment, asynchronous client subsystem calls can timeout after a predetermined period. Moreover, in one embodiment an immediate response to an asynchronous client subsystem call can terminate the client call.

Figure 4:
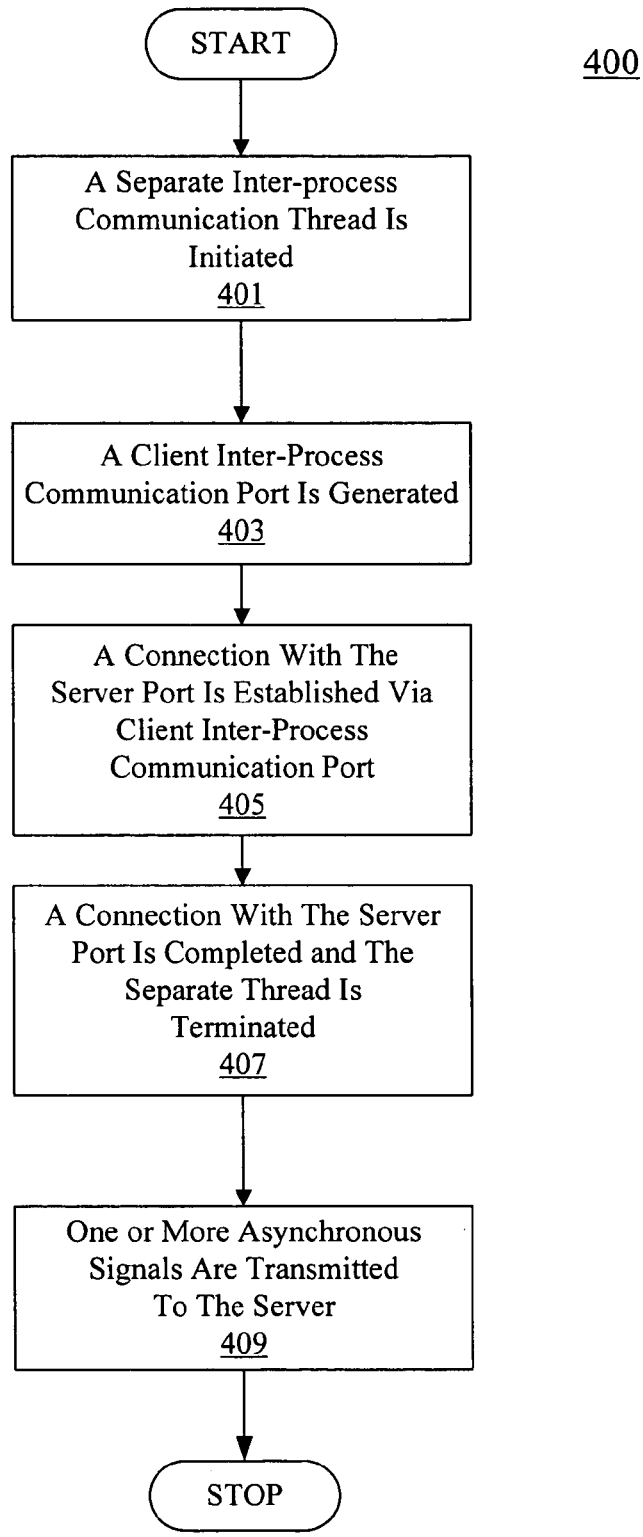
FIG. 4 shows a flowchart of the steps performed in a method for conducting client-server inter-process communications (SCIC) according to one embodiment.

Exemplary Operations of Conducting Client-Server Inter-Process Communications According to Embodiments FIG. 4 shows a flowchart 400 of the steps performed in a method 400 for conducting client-server inter-process communications (SCIC) according to one embodiment. The flowchart includes processes that, in one embodiment can be carried out by processors and electrical components under the control of computer-readable and computer-executable instructions. Although specific steps are disclosed in the flowcharts, such steps are exemplary. That is embodiments are well suited to performing various other steps or variations of the steps recited in the flowcharts. Within various embodiments, it should be appreciated that the steps of the flowcharts can be performed by software, by hardware or by a combination of both.

Referring to FIG. 4, at step 401, a client subsystem inter-process communication thread that is separate from a main client subsystem inter-process communication thread is initiated. In one embodiment, an inter-process communication thread initiator/generator (e.g., 351 in FIG. 3) initiates the generation of the client subsystem inter-process communication thread that is separate from a main client subsystem inter-process communication thread. In one embodiment, the separate client subsystem inter-process communication thread facilitates client subsystem calls that serve to establish a connection with a server subsystem so as to allow information related to the identification of a client side inter-process communications port (e.g., client side port object 255a in FIG. 2B) to be passed to the server subsystem.

At step 403, a client subsystem inter-process communication port is created. In one embodiment, a client subsystem inter-process communication port creator (e.g., 353 in FIG. 3) creates the client side inter-process communication port (e.g., client side port object 255a in FIG. 2B) during the establishment of the connection between the client subsystem and the server subsystem. In one embodiment, the client subsystem inter-process communication port is created in order to facilitate the conduction of client-server inter-process communications that do not rely upon the maintenance of a client subsystem thread that is separate from a main client subsystem thread.

At step 405, the establishment of a connection with the server subsystem via client side inter-process communication port is completed. And, at step 407 when the connection with the server subsystem via the client side inter-process communication port is completed the separate client subsystem inter-process communications thread is terminated.

At step 409, one or more non-blocking asynchronous communications are transmitted to a server side inter-process communication port (e.g., server side port object 251a in FIG. 2B). In one embodiment, an asynchronous communication transmitter (e.g., 355 in FIG. 3) transmits non-blocking asynchronous inter-process communications (non-blocking calls, messages, requests, etc.) to a server side inter-process communication port (e.g., server side port object 251 in FIG. 2B). In one embodiment, the client side inter-process communication port (e.g., client side port object 255a in FIG. 2B) is readied to receive responses to the aforementioned one or more non-blocking asynchronous communications (through the aforementioned establishment of a connection with server subsystem).

With reference to exemplary embodiments thereof, conducting client-server inter-process communications is disclosed. Such communications include initiating an inter-process communication thread that is separate from a main client inter-process communication thread, where the inter-process communication thread that is separate from the main client inter-process communication thread establishes a connection with a server. A client communication port is created during the establishment of the connection with the server. One or more non-blocking asynchronous communications are transmitted to a server communication port. Responses to the one or more non-blocking asynchronous communications are awaited for receipt by the client communication port.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method for conducting client-server inter-process communications, comprising:
   initiating an inter-process communication thread of a client that is separate from a main inter-process communication thread of said client, wherein said inter-process communication thread of said client that is separate from said main inter-process communication thread of said client establishes a connection with a server;

as a part of said inter-process communication thread of said client that is separate from said main inter-process communication thread of said client, creating a client communication port during the establishment of said connection with said server and before the establishment of said connection is completed, and transmitting one or more non-blocking asynchronous communications to a server communication port and awaiting responses to said one or more non-blocking asynchronous communications for receipt by said client communication port;

wherein subsequent to said establishment of said connection with said server said server responds to messages transmitted to it from said client by transmitting messages to said client communication port;

wherein said inter-process communication thread that is separate from said main client process thread is ended after said connection is established.

2. The method of claim 1 wherein a client port identification number is transmitted to said server during said establishment of said connection with said server.

3. The method of claim 1 wherein said one or more non-blocking asynchronous communications timeout after a predetermined period.

4. The method of claim 1 wherein an immediate response to a server request for information terminates said server request for information.

5. A non-transitory computer useable medium having computer-executable instructions for performing steps, comprising:

a communication thread triggering component for triggering an inter-process communication thread of a client that is separate from a main inter-process communication thread of said client, wherein said inter-process communication thread of said client that is separate from said main inter-process communication thread of said client establishes a connection with a server;

a communication port creating component for creating as a part of said inter-process communication thread of said client that is separate from said main inter-process communication thread of said client, a client communication port during the establishment of said connection with said server and before the establishment of said connection is completed, and an asynchronous communications transmitter for transmitting one or more non-blocking asynchronous communications to a server communication port and awaiting responses to said one or more non-blocking asynchronous communications for receipt by said client communication port;

wherein subsequent to said establishment of said connection with said server said server responds to messages transmitted to it from said client by transmitting messages to said client communication port;

wherein said inter-process communication thread that is separate from said main client process thread is ended after said connection is established.

6. The medium of claim 5 wherein a client port identification number is transmitted to said server during said establishment of said connection with said server.

7. The medium of claim 5 wherein said one or more non-blocking asynchronous communications will timeout after a predetermined period.

8. The medium of claim 5 wherein an immediate response to a server request for information terminates said server request for information.

9. An apparatus, comprising:

a computer readable memory unit;

a processor coupled to said memory unit, said processor for executing a method for conducting client-server inter-process communications, comprising:

initiating an inter-process communication thread of a client that is separate from a main inter-process communication thread of said client, wherein said inter-process communication thread of said client that is separate from said main inter-process communication thread of said client establishes a connection with a server;

as a part of said inter-process communication thread of said client that is separate from said main inter-process communication thread of said client, creating a client communication port during the establishment of said connection with said server and before the establishment of said connection is completed, and transmitting one or more non-blocking asynchronous communications to a server communication port and awaiting responses to said one or more non-blocking asynchronous communications for receipt by said client communication port;

wherein subsequent to said establishment of said connection with said server said server responds to messages transmitted to it from said client by transmitting messages to said client communication port;

wherein said inter-process communication thread that is separate from said main client process thread is ended after said connection is established.

10. The apparatus of claim 9 wherein a client port identification number is transmitted to said server during said establishment of said connection with said server.

11. The apparatus of claim 9 wherein said one or more non-blocking asynchronous communications timeout after a predetermined period.

12. The apparatus of claim 9 wherein an immediate response to a server request for information terminates said server request for information.

* * * * *